United States Patent Office 3,703,359
Patented Nov. 21, 1972

3,703,359
POLYMERIC AMINO ALUMINUM BOROHYDRIDE AND METHOD OF PREPARING
Stelvio Papetti, Hamden, Conn., assignor to Olin Mathieson Chemical Corporation
No Drawing. Filed Jan. 31, 1961, Ser. No. 86,232
Int. Cl. C01b 35/00
U.S. Cl. 423—284          9 Claims

ABSTRACT OF THE DISCLOSURE

Polymeric amino aluminum borohydride, $$(BH_4)_2AlNH_2$$

is provided by reacting $R_3Al$, where R is an alkyl group having from 1 to 5 carbon atoms, successively with ammonia and diborane.

---

This invention relates to polymeric amino aluminum borohydride having the empirical formula $(BH_4)_2AlNH_2$ and to a method for its preparation. By the process of this invention polymeric amino aluminum borohydride is prepared by reacting a trialkyl aluminum compound of the formula:

$$R_3Al$$

wherein R is an alkyl radical containing 1 to 5 carbon atoms, successively with ammonia and diborane.

The polymeric amino aluminum borohydride prepared in accordance with the method of this invention, when incorporated with suitable oxidizers such as ammonium perchlorate, potassium perchlorate, sodium perchlorate, ammonium nitrate, and the like, yields solid propellants suitable for rocket power plants and other jet propelled devices. Such propellants burn with high flame speeds, have high heat combustion and are of the high specific impulse type. The solid products of this invention, when incorporated with oxidizers are capable of being formed into a wide variety of grains, tablets and shapes, all with desirable mechanical and chemical properties. Propellants produced by the method described in this application burn uniformly without disintegration when ignited by conventional means, such as a pyro-technic type igniter and are mechanically strong enough to withstand ordinary handling.

In accordance with the present invention it was discovered that trialkyl aluminum compounds can be reacted successively with ammonia and diborane to produce amino aluminum borohydride.

In the first phase of the reaction ammonia is reacted with the trialkyl aluminum compound thus forming the corresponding ammonia adduct of the trialkyl aluminum compound when this phase of the reaction is conducted at low temperatures. When the adduct is heated to temperatures of about 55° C. or above, the dialkyl amino alane is formed with the evolution of the corresponding alkane. If the ammonia is reacted with the trialkyl aluminum compound at a temperature of about 55° C. or higher the ammonia adduct which is formed first immediately evolves the alkane thus yielding directly the dialkyl amino alane. In the second phase of the reaction diborane is reacted with the dialkyl amino alane at temperatures of about 0° up to about 150° C. to form the polymeric amino aluminum borohydride.

The preferred alkyl aluminum compounds have the formula $R_3Al$, wherein R is an alkyl radical having from 1 to 5 carbon atoms. Useful alkyl aluminum compounds include trimethyl aluminum, triethyl aluminum, tri-iso-propyl aluminum, tri-n-propyl aluminum, tri-n-butyl aluminum, and tri-iso-amyl aluminum, etc.

The ratio of the reactants can be varied widely, generally being in the range of about 0.5 to 2.5 moles of ammonia per mole of trialkyl aluminum compound employed and between about 1.0 to 10 moles or more of diborane per mole of trialkyl aluminum compound employed. The ratio of reactants is preferably in excess of stoichiometric. The reaction temperature can also be varied widely generally from about 0° to 150° C. and preferably from 55° C. to 120° C. Reaction pressure can vary from subatmospheric to several atmospheres, i.e. from 0.2 to 10 atmospheres, although atmospheric pressure reactions are convenient. Although the reaction is substantially instantaneous in both phases, that is, in addition of the ammonia and in the addition of the diborane, slow addition of both of these materials is practiced in order to control the reactions.

The reaction is carried out in the presence of an inert organic solvent. Useful solvents include benzene, xylene, toluene, ortho dichlorobenzene, etc. The lower dialkyl ethers such as diethyl ether, methyl ethyl ether, methyl iso-propyl ether, propyl ether, di-n-propyl ether, etc. are also useful solvents for this reaction.

The process of this invention is illustrated in detail in the following examples:

EXAMPLE I

The reactor consisted of a 500 ml., round-bottom, 3-neck flask, equipped with a gas inlet tube, two separatory funnels fitted through a Y-tube to one neck of the flask for the addition of the trialkyl aluminum compound and benzene, and an adapter to which two condensers were attached, one a reflux type mounted in vertical position and the other mounted in a downward position connecting to a receiving flask which served as a receiver for distilled solvent.

During the initial phase of the reaction the reactor system was connected through a Dry-Ice trap to a wet test meter. After the apparatus had been evacuated and refilled with nitrogen, 0.344 mole of trimethyl aluminum and 330 ml. of benzene, dried over sodium ribbon, were added to the flask. The solution was then heated to reflux and ammonia was added until 0.334 mole of methane had evolved as measured by the wet test meter. An excess of ammonia in the amount of 0.0117 mole was then charged to the reactor.

In the second phase of the reaction the ammonia cylinder was disconnected from the gas inlet tube and in turn the inlet tube was connected to a diborane cylinder. In addition, the wet test meter was replaced by two series connected scrubbing towers, the first containing methanol and the second containing a water acetone solution. These towers served to decompose the excess of diborane passing through the reaction system and also to decompose any other borane compounds emitting from the reactor. The amino dimethyl alane solution was heated to about 60° C. and then diborane was added at a rate of 7.5 grams per hour. About 2 moles of diborane for each mole of trimethyl aluminum originally charged to the reactor in the first phase of the reaction was admitted to the reactor through the gas inlet tube. As the reaction was somewhat exothermic only a small quantity of heat was required to maintain the 60° C. temperature. After all the diborane had been added the reaction system was flushed with a stream of nitrogen for approximately ten minutes and then about 200 ml. of benzene was distilled from the reaction flask at room temperature under reduced pressure. Next to the stirred reaction mixture there was added 300 ml. of dry pentane which caused the precipitation of a white, powdery product. The reaction flask was then transferred to a dry box and the liquid layer was decanted in a nitrogen atmosphere. After the mother liquid had been standing for 24 hours a first crop of crystalline product precipitated which was separated from the mother liquid by filtration and dried. After a few days standing a second crop of crystals separated from the mother liquid which was also recovered by filtration and dried.

The combined product was subjected to elemental analysis and the following results were obtained:

Calcd. for $B_2H_{10}AlN$ (percent): B, 29.76; Al, 37.09; N, 19.26. Found (percent): B, 29.7, 29.1; Al, 36.4, 37.2; N, 19.0, 19.1.

Molecular weight determinations on the purified material were conducted in benzene solutions by the cryoscopic method. By this method the molecular weight was found to be 258 thus indicating that the product was a mixture of trimeric and tetrameric amino aluminum borohydride. The density of this product was found to be about 1.14 grams per cc. by liquid (cyclohexane) displacement in a pycnometer.

EXAMPLES II–IV

A number of additional experiments were carried out in the same manner with the same apparatus as described in Example I. The experimental details relating to these experiments are shown in Table 1 which follows.

the wet test meter utilized in Part A of this experiment was replaced by two scrubbing towers connected in series. The first scrubbing tower contained methanol while the second contained a 50 percent aqueous acetone solution. After the diborane had been added, the solution was taken to dryness under vacuum at room temperature and the solid residue was placed under high vacuum for several hours to eliminate the final traces of solvent.

The product was subjected to elemental analysis and the following results were obtained:

Calcd. of $B_2H_{10}AlN$ (percent): B, 29.76; Al, 37.09; N, 19.24. Found (percent): B, 29.9; Al, 37.0; N, 17.0.

Amino aluminum borohydride in the amount of 4.42 grams was obtained in this experiment which corresponds to a 99 percent yield based on the dimethyl amino alane charged to the reactor.

The boron-containing solid materials produced by practicing the method of this invention can be employed as ingredients of solid propellant compositions in accordance with general procedures which are well-understood in the art, inasmuch as the solids produced by practicing

TABLE 1

| Ex. | Benzene (mls.) | $(CH_3)_3Al$ (grams) | $NH_3$ (grams) | $NH_3$ addition temperature (°C) | $B_2H_6$ (grams) | $B_2H_6$ addition temperature (°C) | Weight of polymeric amino aluminum borohydride obtained (grams) | Percent yield | Calcd. Al | B | N | H¹ | H² | Found Al | B | N | H¹ | H |
|---|---|---|---|---|---|---|---|---|---|---|---|---|---|---|---|---|---|---|
| II | 200 | 16.5 | 4.4 | ³ R.T. | ⁴ 19.1 | 60 | 16.4 | 98.3 | 37.1 | 29.7 | 19.2 | 13.7 | 11.1 | 39.7 | 27.5 | 18.4 | 12.8 | 10.03 |
| III | 860 | 64.7 | 17.2 | 80 | ⁴ 40.5 | 57–59 | | | | | | | | 37.8 | 26.1 | 18.9 | 13.3 | 10.9 |
| IV | 170 | 25.5 | 6.3 | 80 | (⁴) | 60 | 25.1 | 97.2 | | | | | | | | | | |

¹ Total.
² Active.
³ In this experiment ammonia was added at room temperature to the trimethyl aluminum solution and the reaction mixture was then heated at 80° C. until a molar amount of methane equal to the number of moles of trimethyl aluminum charged to the reactor had been evolved.
⁴ A large excess of $B_2H_6$ was added in each example to insure completion of the reaction.

NOTE.—The yield and analysis were made on the crude product after it had been washed with pentane and dried

EXAMPLE V (A) Preparation of dimethyl amino alane

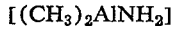
$[(CH_3)_2AlNH_2]$

The apparatus used in this experiment was the same as that utilized in Example I.

In the first step the reaction system was evacuated and filled with nitrogen. Then 49 ml. (0.411 mole) of trimethyl aluminum and 350 ml. of dry benzene was added to the reaction flask. Ammonia gas was introduced into the reactor through the gas inlet tube at room temperature and at a rate of 0.9 gram per minute. In the initial reaction the ammonia adduct of trimethyl aluminum was formed which was evidenced by a warming up of this solution which necessitated the use of a water bath for cooling. As soon as 0.511 mole of ammonia had been added the bath was heated to 60° C. at which temperature gas evolution became rapid and by means of the wet test meter 0.505 mole of methane was measured in a short period. The bulk of the benzene was distilled off and the solid residue remaining was taken to dryness under high vacuum. Infrared analysis showed that the product was dimethyl amino alane and mass spectrographic analysis revealed that the product was a mixture of dimeric dimethyl amino alane.

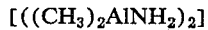
$[((CH_3)_2AlNH_2)_2]$ and trimeric dimethyl amino alane $[((CH_3)_2AlNH_2)_3]$ in a 2:1 ratio. A total 34.6 grams of dimethyl amino alane was recovered which corresponds to a yield of 90.5 percent.

(B) Preparation of polymeric amino aluminum borohydride

A solution of 4.4 grams of $(CH_3)_2AlNH_2$ as prepared in Part A of this example in 75 ml. of benzene was treated with 0.09 mole of diborane. Before adding the diborane, the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose of doing this, as the art is aware, is to provide proper burning characteristics in the final propellant. In addition to the oxidizer and the oxidizable material, the final propellant can also contain an artificial resin, generally of the urea-formaldehyde or phenolformaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al. and U.S. Pat. No. 2,646,596 to Thomas et al.

What is claimed is:

1. As a new composition of matter, polymeric amino aluminum borohydride having the empirical formula $$(BH_4)_2AlNH_2$$

and obtained by reacting a compound of the formula:

$$R_3Al$$

wherein R is an alkyl group having from 1 to 5 carbon atoms, successively with ammonia and diborane at a temperature of from about 0° C. to about 150° C. and in the presence of an inert solvent.

2. A method for the preparation of polymeric amino aluminum borohydride having the empirical formula $$(BH_4)_2AlNH_2$$

which comprises reacting a compound of the formula:

$$R_3Al$$

wherein R is an alkyl group having from 1 to 5 carbon atoms, successively with ammonia and diborane at a temperature of from about 0° C. to about 150° C. in the presence of an inert solvent and recovering the polymeric amino aluminum borohydride thus formed.

3. The method of claim 2 wherein the said compound is trimethyl aluminum.

4. The method of claim 2 wherein the inert solvent is benzene.

5. The method for the preparation of polymeric amino aluminum borohydride having the empirical formula $$(BH_4)_2AlNH_2$$

which comprises reacting trimethyl aluminum successively with ammonia and diborane at a temperature of about 0° C. to about 150° C. in the presence of benzene and recovering the said polymeric amino aluminum borohydride thus formed.

6. A method for the preparation of polymeric amino aluminum borohydride having the empirical formula $$(BH_4)_2AlNH_4$$

which comprises reacting a compound of the formula:

$$R_2AlNH_2$$

wherein R is an alkyl radical having from 1 to 5 carbon atoms, with diborane at a temperature of from 55° C. to about 150° C. in the presence of an inert solvent and recovering the said polymeric amino borohydride thus formed.

7. The method of claim 6 wherein the said compound is dimethyl amino alane.

8. The method of claim 6 wherein the said solvent is benzene.

9. The method for the preparation of polymeric amino aluminum borohydride which comprises reacting dimethyl amino alane with diborane at a temperature of from about 55° C. and about 150° C. in the presence of benzene and recovering the said polymeric amino borohydride thus formed.

References Cited

UNITED STATES PATENTS

| | | | |
|---|---|---|---|
| 2,892,869 | 6/1959 | Groszos | 23—358 |
| 3,148,939 | 9/1964 | Knoth | 23—358 |
| 3,248,168 | 4/1966 | Tyson | 23—358 |
| 3,298,798 | 1/1967 | Zirngiebl et al. | 23—358 |

CARL D. QUARFORTH, Primary Examiner

F. M. GITTES, Assistant Examiner

U.S. Cl. X.R.

423—286; 149—17